US005763535A

United States Patent [19]
Adachi et al.

[11] Patent Number: 5,763,535
[45] Date of Patent: Jun. 9, 1998

[54] PROCESS FOR PRODUCTION OF A POWDER COATING

[75] Inventors: Takato Adachi, Hiratsuka; Nobushige Numa, Ebina, both of Japan

[73] Assignee: Kansai Paint Co., Ltd., Hyogo, Japan

[21] Appl. No.: 823,874

[22] Filed: Mar. 17, 1997

[30] Foreign Application Priority Data

Mar. 19, 1996 [JP] Japan ................................ 8-100609

[51] Int. Cl.$^6$ ........................................... C08F 6/12
[52] U.S. Cl. ........................ 525/386; 524/379; 524/561;
525/327.3; 525/328.8; 525/330.9; 525/386;
525/327.6; 525/384
[58] Field of Search ................................ 524/379, 561;
525/327.3, 328.8, 330.3, 386, 384

[56] References Cited

U.S. PATENT DOCUMENTS

| | | | |
|---|---|---|---|
| 4,044,190 | 8/1977 | Miller et al. | 428/463 |
| 4,212,918 | 7/1980 | Marquisee | 428/403 |
| 5,043,404 | 8/1991 | Mahabadi et al. | 526/194 |

Primary Examiner—Bernard Lipman
Attorney, Agent, or Firm—Foley & Lardner

[57] ABSTRACT

A process for production of a powder coating comprising: copolymerizing a monomer mixture comprising a (meth) acrylate monomer having branched or cyclic substituents of four or more carbon atoms in its side chain and a (meth) acrylate monomer having functional groups to form a thermosetting vinyl copolymer (a) having a glass transition temperature of approximately 40° to 100° C. and a number average molecular weight of approximately 1,000 to 10,000; dissolving or dispersing said copolymer (a) and a crosslinking agent (b) in a solvent comprising approximately at least 50% by weight based on the weight of the solvent, of tert-butanol, to form a resulting coating solution having a melting point of not less than approximately −30° C.; and lyophilizing said coating solution under a pressure not higher than approximately 50 mmHg. The present process produces a powder coating without polymerization due to progression of reaction upon heat generated during production, and without generation of gelated material.

18 Claims, No Drawings

PROCESS FOR PRODUCTION OF A POWDER COATING

BACKGROUND OF THE INVENTION

1. Field of the Invention

The present invention relates to a process for production of a powder coating. More particularly, the present invention relates to a process for production of a powder coating using tert-butanol as a solvent, wherein resin, a crosslinking agent, additives and the like are dissolved, then frozen, and lyophilized.

2. Description of Related Art

A powder coating is suitable, in particular, for use as a clear top coat for automobiles.

Conventional powder coatings have been produced by grinding and mixing resin, crosslinking agents, additives and the like, blending them in a melt kneader, followed by grinding. In such processes, however, since resin and crosslinking agents are melted with heat and kneaded, the resulting reaction between the resin and the crosslinking agent proceeds to polymerization. As a result, melt viscosity of the coating increases and the finish of a coated product may be deteriorated. Sometimes, gelated materials may be produced, which may cause deathblow or disastrous defects for coating appearance, particularly for thin clear films. Dust, lumps and the like mixed during the production process can not be removed in the conventional processes because it is difficult to filter the coating composition. The inclusion of dust, lumps, or the like in the composition creates significant problems, particularly when the composition is used as a clear top coat for automobiles which requires high-grade films. Moreover, the heat generated during production partly facilitates the progression of crosslinking reactions and the formation of dust, gelated materials or the like. Therefore, it is substantially impossible to recover and reuse the coating for applications which require a high-grade coating appearance.

A process different from the above-mentioned ones, has been proposed in Japanese Laid-Open Patent No. 92318/1975 which includes lyophilization. However, this reference includes no particular limitations for solvent, resin or the like. Further, there are no other publications which would enable those skilled in the art to carry out a suitable lyophilization. Therefore, it is not easy to find the optimum balance of resin solubility, crosslinking agent, solvent, additives, etc. and lyophilization technique from the description in this document. In addition, it also is difficult and/or not optimal to use benzene, which is often used for lyophilization, from the viewpoint of toxicity. Disadvantageously, a large amount of dioxane which has good solubility should not be used for sanitary reasons.

SUMMARY OF THE INVENTION

Objects addressed by the present invention include, for example, providing a solvent composition or resin composition which completely dissolves resin, a crosslinking agent, additives, etc. and that can be readily lyophilized without toxicity, and produces a thermosetting powder coating which forms a good film with a high quality finish and without substantial dust and/or gelated materials mixed therein.

In accordance with these and other objects, there is provided a process for production of a powder coating comprising: copolymerizing a monomer mixture comprising a (meth)acrylate monomer having branched or cyclic substituents of four or more carbon atoms in its side chain and a (meth)acrylate monomer having functional groups to form a thermosetting vinyl copolymer (a) having a glass transition temperature of approximately 40° to 100° C. and a number average molecular weight of approximately 1,000 to 10,000; dissolving or dispersing said copolymer (a) and a crosslinking agent (b) in a solvent comprising approximately 50% by weight or more of tert-butanol, to form a resulting coating solution having a melting point of not less than approximately −30° C.; and lyophilizing said coating solution under a pressure not higher than approximately 50 mmHG.

In further accordance with these and other objects, there is provided a resin solution having a melting point of not less than approximately −30° C. suitable for use in preparing a powder coating, said solution comprising: a thermosetting vinyl copolymer (a) having a glass transition temperature of approximately 40° to 100° C. and a number average molecular weight of approximately 1,000 to 10,000 prepared from a monomer mixture comprising a (meth)acrylate monomer having branched or cyclic substituents of four or more carbon atoms in its side chain and a (meth)acrylate monomer having functional groups; a crosslinking agent (b); and a solvent comprising approximately at least 50% by weight based on the weight of the solvent, of tert-butanol.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF PREFERRED EMBODIMENTS

The present inventors have studied intensively to solve the problems described above. As a result, the inventors have found a process to conveniently produce a powder coating with excellent finish by lyophilization using a specific solvent composition and resin composition, and have attained the present invention.

That is, the present invention relates to a process for producing a powder coating, wherein thermosetting vinyl copolymer (a) having a glass transition temperature of approximately 40° to 100° C. and a number average molecular weight of approximately 1,000 to 10,000, which can be obtained by copolymerization of a monomer mixture containing (meth)acrylate monomer having branched or cyclic substituents of four or more carbon atoms in its side chain and (meth)acrylate monomer having functional groups as essential ingredients, and a crosslinking agent (b) can be dissolved or dispersed in a solvent consisting of approximately 50% by weight or more tert-butanol, and the resulting coating solution having melting point of not less than approximately −30° C. can be lyophilized under pressure of not higher than approximately 50 mmHg.

Powder coatings according to the present invention preferably can form a film with a high quality finish without reaction due to heat generated during production. Coatings prepared with the present powder coatings are also able to be recovered and reused.

A suitable vinyl copolymer (a) can be obtained by copolymerization of a monomer mixture containing approximately 20 to 65% by weight based on the weight of the monomer mixture of a (meth)acrylate monomer having branched or cyclic substituents of four or more carbon atoms in its side chain. Approximately 20 to 70% by weight based on the weight of the monomer mixture of the (meth)acrylate monomer having functional groups can be used. A suitable (meth)acrylate monomer having functional groups can be selected from epoxy-containing unsaturated monomers, hydroxyl-containing unsaturated monomers, and carboxyl-containing unsaturated monomers. Further, the vinyl copolymer (a) can have glycidyl functionality. The crosslinking agent (b) can be an aliphatic polycarboxylic acid or an acid anhydride of an aliphatic polycarboxylic acid. Approximately 10 to 60% by weight based on the weight of the monomer mixture of a non-functional unsaturated monomer can optionally be used simultaneously. A suitable crosslinking agent (b) can be dodecanoic diacid, and the solvent composition may be composed of approximately 50 to 100% by weight of tert-butanol, 0 to 50% by weight of dioxane, and 0 to 20% by weight of other solvents. The solvent composition in one embodiment, may comprise not less than 80% by weight of tert-butanol.

The thermosetting vinyl copolymer (a) in the powder coating composition used for the process for production of the a powder coating according to the present invention can be obtained by copolymerization of at least one (meth) acrylate monomer having branched or cyclic substituents of four or more carbon atoms in its side chain and at least one (meth)acrylate monomer having functional groups. Other polymerizable unsaturated monomers may optionally be added as needed.

(Meth)acrylate monomers having branched or cyclic substituents of four or more carbon atoms in their side chains may include, for example, a methacrylic acid ester having branched substituents of four or more carbon atoms such as iso-butyl (meth)acrylate, tert-butyl (meth)acrylate; a (meth)acrylate ester having alicyclic rings in substituents such as cyclohexyl (meth)acrylate, isobornyl (meth)acrylate, tricyclodecanyl (meth)acrylate, etc.

Polymerizable functional group-containing (meth)acrylate monomers may include, for example, epoxy containing unsaturated monomers such as glycidyl (meth)acrylate, glycidyl allyl ether, 3,4epoxycyclohexylmethyl (meth)acrylate, β-methylglycidyl (meth)acrylate; hydroxyl-containing unsaturated monomer such as 2-hydroxyethyl (meth)acrylate, 2-hydroxypropyl (meth)acrylate, 3-hydroxypropyl (meth)acrylate, hydroxybutyl (meth)acrylate, (poly)ethylene glycol mono(meth)acrylate, hydroxyethylvinyl ethers; carboxyl-containing unsaturated monomers such as acrylic acid, methacrylic acid, crotonic acid, itaconic acid, maleic acid, fumaric acid.

The optionally copolymerizable non-functional unsaturated monomers if employed, may include, for example, methacrylic acid ester such as methyl (meth)acrylate, ethyl (meth)acrylate, n-butyl (meth)acrylate, octyl (meth)acrylate, lauryl (meth)acrylate, dodecyl (meth)acrylate, stearyl (meth) acrylate, dodecyl (meth)acrylate; vinyl aromatic monomer such as styrene, vinyltoluene, etc.

(Meth)acrylate monomers having branched or cyclic substituents of four or more carbon atoms which can be used for production of vinyl copolymer (a) may be suitably employed in an amount from approximately from 20 to 65% by weight, preferably 30 to 60% by weight, based on the weight of the monomer mixture. However, it should be understood that the copolymerized amount is not limited to the numerals above. However, when the copolymerized amount of (meth) acrylate monomers having branched or cyclic substituents of four or more carbons is less than 20% by weight, solubility in the solvent described below, particularly in tert-butanol may be affected, and often is reduced. A reduced solubility may result in a heterogeneous coating solution and a deteriorated finish of the film formed from such a powder coating.

Functional group-containing (meth)acrylate monomers can be used in the range between approximately 20 and 70% by weight, preferably 30 and 45% by weight based on the weight of the monomer mixture. However, the range is not strictly limited.

Further, other non-functional unsaturated monomers can optionally be included in the range between approximately 10 and 60% by weight (not strictly limited). When styrene is used, it is suitably not more than 35% by weight, preferably not more than 25% by weight. The amount of styrene is not strictly limited to the range; however, when 36% by weight or more styrene is copolymerized, solubility in tert-butanol can be significantly reduced, resulting in a heterogeneous coating solution.

The vinyl copolymer (a) used in the present invention should preferably have a glass transition temperature of approximately 40° to 100° C., most preferably 50° to 80° C. The glass transition temperature should not be strictly limited to the range. However, when the glass transition temperature is below about 40° C., blocking resistance of the resulting powder coating can be deteriorated, and when the glass transition temperature is above about 100° C., viscosity upon heat flow can increase, which may spoil finish properties, and at the same time, decrease solubility in a solvent for lyophilization, and further deteriorate finish properties.

The above-described glass transition temperature (Tg, °C.) is obtained by converting a value (°K), calculated from the following Fox's equation, into (°C.):

$$100/Tg = W1/Tg1 + W2/Tg2 + W3/Tg3 + W4/Tg4$$

(wherein W1, W2, W3, W4 respectively represent the % by weight of the monomer used for each copolymer, and Tg1, Tg2, Tg3, Tg4 represent glass transition temperature (°K) of each polymer).

The crosslinking agent (b) is not particularly limited, but the conventionally known crosslinking agents can be used as long as they react with the functional group of the vinyl copolymer (a) to harden. Examples of suitable crosslinking agents (b) include, aliphatic polycarboxylic acids such as adipic acid, sebacic acid, suberic acid, succinic acid, glutaric acid, maleic acid, fumaric acid, dodecanoic diacid, piperic acid, azelaic acid, itaconic acid, citraconic acid and (poly) acid anhydride thereof; aromatic polycarboxylic acids such as terephthalic acid, isophthalic acid, phthalic trimellitic acid, pyromellitic acid and (poly)acid anhydride thereof; alicyclic polycarboxylic acids such as hexahydrophthalic acid, hexahydroisophthalic acid, methylhexahydrophthalic acid; and (anhydrous) polycarboxylic acids such as anhydrides thereof. Other examples include, a block isocyanate compound obtained by blocking aliphatic, alicyclic or aromatic polyisocyanate such as isophorone diisocyanate, hexamethylene diisocyanate, hydrogenated xylene diisocyanate, hydrogenated tolylene diisocyanate, with a blocking agent such as phenols, caprolactons, alcohols; polyepoxy compounds such as trisepoxypropyl isocyanurate, hydrogenated bisphenol A, Celoxide 2021 (manufactured by Dicel Chemical Industry, Ltd.), EHPE-3150 (manufactured by Dicel Chemical Industry, Ltd.).

The crosslinking agent (b) can be used alone or as a combination of two or more crosslinking agents. Among the above groups, aliphatic polycarboxylic acid and acid anhydrides thereof are preferred. Among them, dodecanoic diacid is excellent in blocking resistance and finish appearance of the coating.

As optional additives (c), those conventionally included in a coating can be used and include, for example, antifoaming agent, surface controlling agent, antioxidant, UV absorber, UV stabilizer, anti-blocking agent, fluidization controlling agent, static controlling agent, coloring pigment, filler, and hardening accelerator.

In the present invention, as a solvent which can dissolve or disperse vinyl copolymer (a) and cross-linking agent (b), tert-butanol alone or a mixed solvent of tert-butanol and dioxane may be used.

These solvents having a high solubility of resin, crosslinking agents, additives, etc. and a high melting point, and a high vapor pressure are particularly suitable because solvents having these properties save energy required for freezing, can afford without highly reduced pressure and require a shorter time under reduced pressure for lyophilization. In addition, so as not to lower the melting point below approximately $-40°$ C., other solvents, for example, methyl ethyl ketone or toluene may be used simultaneously with tert-butanol. The lower limitation of melting point of $-40°$ C. is not strict, even though, when the melting point is lower than $-40°$ C., the solvent may require substantial energy for freezing, and further the resin and a crosslinking agent may separate upon cooling, thus deteriorating the finish properties of the coating.

When a mixed solvent is used as a solvent, tert-butanol should preferably be used in an amount of not less than approximately 50% by weight, more preferably not less than 70% by weight, most preferably not less than 80% by weight, all weights being based on the total weight of the solvent. On the other hand, dioxane should be preferably decreased to less than approximately 50% by weight, preferably less than 30% by weight, more preferably less than 20% by weight based on the total weight of the solvent. When other solvents are used, they should be used in the amount of not more than approximately 20% by weight, again based on the total weight of the solvent.

The amount of tert-butanol should not be strictly limited to the amount described above. However, when the amount of tert-butanol is less than 50% by weight, the vapor pressure of the solvent may decrease, requiring highly reduced pressure and a longer time periods under reduced pressure, sometimes reducing solubility of the crosslinking agent. The amount of dioxane should not be strictly limited to the amount above. However, the use of more than 50% by weight of dioxane can possibly be accompanied with sanitary problems. Large amounts of dioxane may also decrease the vapor pressure of the solvent, requiring highly reduced pressure and prolonged time under reduced pressure.

The process for producing a powder coating of the present invention preferably includes dissolving the aforementioned vinyl copolymer (a), a crosslinking agent (b), additives and the like, filtering using a suitable filtration device, freezing generally at $10°$ to $-30°$ C., reducing pressure below 50 mmHg, and collecting using a cold trap. After lyophilization, fine particles having particle diameter of about 10 μm can be readily obtained by simple grinding and filtration using a screen. Accordingly, a powder coating can be produced without requiring a grinding step, etc.

The present invention will be illustrated in detail in the following examples.

EXAMPLES

Production of Resin Solution (A)

100 parts by weight of tert-butanol was charged in a reactor equipped with a thermometer, a thermostat, a stirrer, a reflux condenser and a dropping device, and heated to $82°$ C. while blowing nitrogen gas, to which was added dropwise a mixture of cyclohexyl (meth)acrylate (50 parts by weight), tert-butyl-(meth)acrylate (15 parts by weight), glycidyl (meth)acrylate (35 parts by weight), azobisdimethyl valeronitrile (7 parts by weight) over about 3 hours. After completion of addition, the mixture was left at $82°$ C. for 2 hours to complete the reaction to produce resin solution (1).

Production of Resin Solutions (B to I)

In the same manner as described for resin solution (A), each solution was produced using the formulation given in Table 1.

Example 1

Resin solution (A) (200 parts by weight), dodecanoic diacid (25 parts by weight), tert-butanol (190 parts by weight) were added and, after dissolution, cooled to $-10°$ C. and frozen. Subsequently, pressure was reduced under 1.0 mmHg, and the temperature was gradually brought back to ambient temperature to prevent melting. The resulting solid was filtered through 150 mesh screen and lightly ground to produce a powder coating.

Examples 2 to 7

Using resin solutions (A) to (F), a coating was produced in the same manner as described in Example 1.

Comparative Examples 1 to 4

Using resin solutions (A), (G), (H), (I) and solvents given in Table 2, coatings were produced in the same manner as described in Example 1.

TABLE 1

| | Resin Solution | | | | | | | | |
|---|---|---|---|---|---|---|---|---|---|
| | (A) | (B) | (C) | (D) | (E) | (F) | (G) | (H) | (I) |
| Formulation | | | | | | | | | |
| Styrene | | | | | | 15 | | 45 | |
| Methyl (meth)acrylate | | | | | | | | | 40 |
| n-Butyl (meth)acrylate | | | | 15 | | | | 20 | 25 |
| iso-Butyl (meth)acrylate | | | 40 | | 15 | 35 | 15 | | |
| tert-Butyl (meth)acrylate | 15 | 15 | 25 | | 50 | 15 | | | |
| Cyclohexyl (meth)acrylate | 50 | 50 | | | 50 | | 50 | | |
| Glycidyl (meth)acrylate | 35 | 35 | 35 | 35 | 35 | 35 | 35 | 35 | 35 |
| Initiator | 7 | 5 | 7 | 4 | 9 | 7 | 2 | 7 | 7 |
| Resin Tg (°C.) | 65 | 65 | 65 | 51 | 80 | 65 | 65 | 65 | 65 |
| Number-average molecular weight | 4000 | 6000 | 4000 | 8000 | 3000 | 4000 | 12000 | 4000 | 4000 |

TABLE 2

|  | Example | | | | | | | Comparative Example | | | | |
|---|---|---|---|---|---|---|---|---|---|---|---|---|
|  | 1 | 2 | 3 | 4 | 5 | 6 | 7 | 1 | 2 | 3 | 4 | 5 |
| Type of resin solution | (A) | (B) | (A) | (C) | (D) | (E) | (F) | (A) | (G) | (H) | (I) | (A) |
| Solvent Composition | | | | | | | | | | | | |
| tert-Butanol (wt %) | 100 | 100 | 80 | 100 | 100 | 100 | 100 |  | 100 | 100 | 100 | 100 |
| Dioxane (wt %) |  |  | 20 |  |  |  |  | 100 |  |  |  |  |
| Solubility | | | | | | | | | | | | |
| Resin | ⊚ | ○ | ⊚ | ○ | ⊚ | ⊚ | ○ | ⊚ | Δ | Δ | Δ |  |
| Dodecanoic diacid | ⊚ | ⊚ | ⊚ | ⊚ | ⊚ | ⊚ | ⊚ | Δ | ⊚ | ⊚ | ⊚ |  |
| Film | | | | | | | | | | | | |
| Appearance (smoothness, gloss) | ⊚ | ○ | ⊚ | ⊚ | ⊚ | ⊚ | ○ | Δ | X | X | Δ | Δ |
| Appearance (foaming) | ○ | ○ | ○ | ○ | ○ | ○ | ○ | Δ | Δ | ○ | ○ | ○ |
| 60° Gloss | 90 | 83 | 89 | 87 | 88 | 87 | 83 | 75 | 66 | 63 | 72 | 80 |

Comparative Example 5

Solvent was removed from the resin solution (A) by distillation under reduced pressure to obtain solid resin. This solid resin (100 parts by weight) and dodecanoic diacid (25 parts by weight) was dry blended in a Henschel mixer at room temperature, then melt kneaded in an extruder. After cooling, pulverization by a pin disk, and filtration through 150 mesh screen, a powder coating was obtained.

Film properties of the prepared powder coatings are given in Table 2. Testing in Table 2 was carried out as follows:

Evaluation of Solubility in a Solution State

Solubility of solution before lyophilization was evaluated in the state of a coating solution at 25° C. As for resin, evaluation was made according to the following standard: ⊚: completely dissolved; ○: blueing without precipitation; Δ: clouded and slightly precipitated. Solubility of a crosslinking agent, dodecanoic diacid, was also evaluated according to the following standard: ⊚: completely dissolved; Δ: crystalline found to separate out.

On a dull steel plate of 0.8 mm thick which was subjected to chemical conversion treatment with zinc phosphate, epoxy cation electrodeposition coating was applied to give a film having a dry thickness of 20 microns and baked. On the resulting electrodeposition coating, a surface for intermediate coat of an automobile was baked to give a film of 20 microns of dry thickness. This was followed by water sanding with #400 sand paper, then dewatered and dried. Subsequently, Magicron base coat HM-22 (manufactured by Kansai Paint Co., Ltd., metallic coating, trade name) was coated to give a hardened film of about 15 microns thick, baked and hardened in a dryer at 140° C. for about 30 minutes to give a material to be tested.

Subsequently, electrostatic coating was conducted on the surface of said material to give a powder coating of about 70 microns thick, then heated in a dryer at 160° C. for 30 minutes to harden. The resulting coated plate was tested by the following test:

Film Appearance

Film appearance was evaluated from the viewpoint of gloss and smoothness according to the following standard: ⊚: good; ○: slightly bad smoothness but good gloss; Δ: slightly bad; X: bad.

Foaming was evaluated according to the following standard: ○: good; Δ: a small amount of foaming generated.

60° gloss

Specular reflectivity at 60° was measured according to JISK-5400.

The present invention can provide a powder coating with good and/or high quality finish properties without increasing melting viscosity of coating because reaction due to heat during production does not take place.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

The entire disclosure of Japanese Patent Application No. 8-100609 filed on Mar. 19, 1996, including specification and claims are herein incorporated by reference in its entirety.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A process for production of a powder coating comprising:

copolymerizing a monomer mixture comprising a (meth) acrylate monomer having branched or cyclic substituents of four or more carbon atoms in its side chain and a (meth)acrylate monomer having functional groups to form a thermosetting vinyl copolymer (a) having a glass transition temperature of approximately 40° to 100° C. and a number average molecular weight of approximately 1,000 to 10,000;

dissolving or dispersing said copolymer (a) and a crosslinking agent (b) in a solvent comprising approximately at least 50% by weight based on the weight of the solvent, of tert-butanol, to form a resulting coating solution having a melting point of not less than approximately −30° C.; and lyophilizing said coating solution under a pressure not higher than approximately 50 mmHG.

2. A process for production of a powder coating according to claim 1, wherein said vinyl copolymer (a) is prepared by copolymerizing a monomer mixture comprising approximately 20 to 65% by weight based on the weight of the monomer mixture, of a (meth)acrylate monomer with branched or cyclic substituents having four or more carbon atoms.

3. A process for production of a powder coating according to claim 1, wherein said (meth)acrylate monomer with functional groups is present in an amount from approximately 20 to 70% by weight based on the weight of the monomer mixture.

4. A process for production of a powder coating according to claim 1, wherein the (meth)acrylate monomer with functional groups is selected from the group consisting of epoxy-containing unsaturated monomers, hydroxyl-containing unsaturated monomers, and carboxyl-containing unsaturated monomers.

5. A process for production of a powder coating according to claim 1, wherein said vinyl copolymer (a) has glycidyl functionality and said crosslinking agent (b) is an aliphatic polycarboxylic acid or an acid anhydride of an aliphatic polycarboxylic acid.

6. A process for production of a powder coating according to claim 1, further comprising employing approximately 10 to 60% by weight of a non-functional unsaturated monomer in said monomer mixture.

7. A process for production of a powder coating according to claim 5, wherein the crosslinking agent (b) is dodecanoic diacid.

8. A process for production of a powder coating according to claim 1, wherein the solvent consists of approximately 50 to 100% by weight of tert-butanol, approximately 0 to 50% by weight of dioxane and 0 to 20% by weight of other solvents based on the total weight of the solvent.

9. A process for production of a powder coating according to claim 1, wherein the solvent composition comprises not less than 80% by weight of tert-butanol.

10. A process for production of a powder coating according to claim 1, further comprising mixing an additive (c) in said coating solution, said additive being selected from the group consisting of anti-foaming agents, surface controlling agents, antioxidants, UV absorbers, UV stabilizers, anti-blocking agents, fluidization controlling agents, static controlling agents, coloring pigments, fillers, and hardening accelerators.

11. A process for production of a powder coating according to claim 1, further comprising:

after said lyophilization, collecting said powder coating using a cold trap.

12. A process for production of a powder coating according to claim 1, wherein said polymerizable functional group-containing (meth)acrylate monomer is selected from the group consisting of glycidyl (meth)acrylate, glycidyl allyl ether, 3,4epoxycyclohexylmethyl (meth)acrylate, β-methylglycidyl (meth)acrylate, 2-hydroxyethyl (meth)acrylate, 2-hydroxypropyl (meth)acrylate, 3-hydroxypropyl (meth)acrylate, hydroxybutyl (meth)acrylate, (poly)ethylene glycol mono(meth)acrylate, hydroxyethylvinyl ethers, acrylic acid, methacrylic acid, crotonic acid, itaconic acid, maleic acid, fumaric acid.

13. A process for production of a powder coating according to claim 1, wherein said (meth)acrylate monomer having branched or cyclic substituents of four or more carbon atoms in its side chain is selected from the group consisting of isobutyl (meth)acrylate, tert-butyl (meth)acrylate, cyclohexyl (meth)acrylate, isobornyl (meth)acrylate, and tricyclodecanyl (meth)acrylate.

14. A process for production of a powder coating according to claim 5, wherein said non-functional unsaturated monomer is selected from the group consisting of a methacrylic acid esters and vinyl aromatic monomers.

15. A process for production of a powder coating according to claim 1, wherein said crosslinking agent (b) is one or more compounds selected from the group consisting of aliphatic polycarboxylic acids or acid anhydrides, aromatic polycarboxylic acids or acid anhydrides, alicyclic polycarboxylic acids, (anhydrous) polycarboxylic acids, and a block isocyanate compound.

16. A process for production of a powder coating according to claim 15, wherein said aliphatic polycarboxylic acids may be acids or (poly)acid anhydrides, and are selected from the group consisting of adipic acid, sebacic acid, suberic acid, succinic acid, glutaric acid, maleic acid, fumaric acid, dodecanoic diacid, piperic acid, azelaic acid, itaconic acid, and citraconic acid.

17. A process for the production of a powder coating according to claim 15, wherein said aromatic polycarboxylic acids may be acids or anhydrides, and are selected from the group consisting of terephthalic acid, isophthalic acid, phthalic trimellitic acid, and pyromellitic acid.

18. A process for the production of a powder coating according to claim 15, wherein said alicyclic polycarboxylic acids may be acids or anhydrides, and are selected from the group consisting of hexahydrophthalic acid, hexahydroisophthalic acid, methylhexahydrophthalic acid.

* * * * *